(12) United States Patent
Poulsen et al.

(10) Patent No.: US 7,359,939 B2
(45) Date of Patent: Apr. 15, 2008

(54) FAST SERVICE RESTORATION FOR LOST IGMP LEAVE REQUESTS

(75) Inventors: Allan Leslie Poulsen, Kanata (CA); Bakri Aboukarr, Kanata (CA); Stephen Elliott Crane, Kinburn (CA)

(73) Assignee: Alcatel Canada, Inc., Ottawa, Ontario (CA)

( * ) Notice: Subject to any disclaimer, the term of this patent is extended or adjusted under 35 U.S.C. 154(b) by 871 days.

(21) Appl. No.: 10/310,910

(22) Filed: Dec. 6, 2002

(65) Prior Publication Data

US 2004/0111470 A1 Jun. 10, 2004

(51) Int. Cl.
*G06F 15/16* (2006.01)
*G06F 15/173* (2006.01)
*H04L 12/28* (2006.01)
*G06F 11/00* (2006.01)

(52) U.S. Cl. ............... 709/204; 709/205; 709/218; 709/223; 709/224; 709/229; 709/249; 714/16; 370/254

(58) Field of Classification Search ........ 709/203–205, 709/218, 223–229, 237, 249; 714/16; 370/254
See application file for complete search history.

(56) References Cited

U.S. PATENT DOCUMENTS

| | | | | |
|---|---|---|---|---|
| 6,226,686 B1 * | 5/2001 | Rothschild et al. | ......... | 709/245 |
| 6,532,233 B1 * | 3/2003 | Matsunaga et al. | ......... | 370/390 |
| 6,721,318 B1 * | 4/2004 | Cai et al. | .................... | 370/390 |
| 6,765,892 B1 * | 7/2004 | Leung et al. | ............... | 370/332 |
| 6,791,949 B1 * | 9/2004 | Ryu et al. | .................... | 370/254 |
| 6,804,236 B1 * | 10/2004 | Mahajan et al. | ............ | 370/390 |
| 6,826,612 B1 * | 11/2004 | Bosloy et al. | ............... | 709/227 |
| 6,847,638 B1 * | 1/2005 | Wu et al. | .................... | 370/389 |
| 6,963,573 B1 * | 11/2005 | Cain et al. | ................... | 370/401 |
| 6,977,891 B1 * | 12/2005 | Ranjan et al. | ............. | 370/229 |
| 6,988,146 B1 * | 1/2006 | Magret et al. | .............. | 709/238 |
| 6,999,465 B2 * | 2/2006 | McDonald et al. | ......... | 370/432 |
| 7,120,147 B2 * | 10/2006 | Derango et al. | ............ | 370/390 |
| 7,254,608 B2 * | 8/2007 | Yeager et al. | ............... | 709/203 |
| 2002/0097728 A1 * | 7/2002 | Hinderks et al. | ...... | 370/395.52 |

(Continued)

OTHER PUBLICATIONS

Cain, Brad and Hardjono, Thomas. "Key Establishment for IGMP Authentication in IP Multicast," 1st European Conference on Universal Multiservice Networks, Oct. 4, 2000, pp. 247-252.*

(Continued)

*Primary Examiner*—Jason D Cardone
*Assistant Examiner*—Melvin H Pollack
(74) *Attorney, Agent, or Firm*—Jim Zegeer

(57) ABSTRACT

Whenever a DSLAM or a network node receives a Group Join message, it compares the MAC address of the originating STB to that of previous Join messages with their existing connections. If a match is found, then the DSLAM will initiate a GSQ for the group of the matching previous Join request. If there is not enough resources to satisfy the requirements of Group Join messages, then it may either be ignored, or queued for later processing, once the normal GSQ sequence is complete and resources are available. If the multicast group is no longer needed, the connection to the group is then terminated, as per normal GSQ processing. This frees up bandwidth for any new Join messages. The normal GSQ processing clears the trouble caused by the loss of Leave Message.

4 Claims, 2 Drawing Sheets

U.S. PATENT DOCUMENTS

| | | | |
|---|---|---|---|
| 2002/0143951 A1* | 10/2002 | Khan et al. | 709/227 |
| 2002/0191631 A1* | 12/2002 | Couty | 370/432 |
| 2003/0018715 A1* | 1/2003 | O'Neill | 709/204 |
| 2003/0035378 A1* | 2/2003 | Nguyen et al. | 370/250 |
| 2003/0041171 A1* | 2/2003 | Kobayashi | 709/242 |
| 2003/0145102 A1* | 7/2003 | Keller-Tuberg | 709/237 |
| 2003/0165140 A1* | 9/2003 | Tang et al. | 370/393 |
| 2004/0133669 A1* | 7/2004 | Jalonen et al. | 709/224 |
| 2006/0034278 A1* | 2/2006 | Hundscheidt et al. | 370/390 |

OTHER PUBLICATIONS

Lin, John C. and Paul, Sanjoy. "RMTP: A Reliable Multicast Transport Protocol," Proceedings IEEE INFOCOM '96. 15th Annual Joint Conference of the IEEE Computer Societies: Networking the Next Generation. vol. 3. Mar 28, 1996. pp. 1414-1424.*

Papadopoulos, Christos et al. "An Error Control Scheme for Large-Scale Multicast Applications," Proceedings IEEE INFOCOM '98. 17th Annual Joint Conference of the IEEE Computer and Communications Societies, vol. 3, Apr. 2, 1998. pp. 1188-1196.*

Rizzo, Luigi. "Fast Group Management in IGMP," Proceedings of Hipparc, 1998, pp. 1-10.*

Cain, B. et al. "Internet Group Management Protocol, Version 3," RFC 3376, Oct. 2002, pp. 1-53.*

Fenner, B. "IANA Considerations for IPv4 Internet Group Management Protocol (IGMP)," RFC 3228, Feb. 2002, pp. 1-4.*

McCloghrie, K. et al. "Internet Group Management Protocol MIB," RFC 2933, Oct. 2000, pp. 1-19.*

Conta, A. and Deering, S. "Internet Control Message Protocol (ICMPv6) for the Internet Protocol Version 6 (IPv6) Specification," RFC 2463, Dec. 1998, pp. 1-18.*

* cited by examiner

FAST SERVICE RESTORATION FOR LOST IGMP LEAVE REQUESTS

BACKGROUND AND BRIEF DESCRIPTION OF THE INVENTION

As data communication systems continue to evolve, the bandwidth capabilities of such communication systems continue to increase. As such, applications that require large amounts of bandwidth become increasingly feasible. One such application is the distribution of digital media services. Digital media services can provide video information such as television programs or movies, audio programs, and text based information streams.

Typically, the various types of digital media that may be provided are sourced from one or more information sources. These information sources are intended to provide the multimedia programming to a large number of users that have access to the information via one or more communication networks. Destination routers coupled to the communication network provide interfaces to end users, or subscribers.

Typically, multiple subscribers are coupled to a single communication link that is coupled to the router. This communication link is utilized for distribution of the program data streams, or channels, to the end users. The Internet Group Management Protocol (IGMP) has been developed by the Internet Engineering Task Force (IETF) as a standard that relates to the communication between the router and the subscriber, which is often referred to as a host. The communication between the router and the set of hosts coupled to a particular communication link is accomplished using point-to-multipoint multicast transmissions. IETF specifications RFC1112 "Host Extensions for IP Multicasting" and RFC2236 "Internet Group Management Protocol, version 2" describe the use of the current IGMP standard in detail. (A table of acronyms used herein can be found at the end of this specification.)

The IGMP protocol as currently defined by the IETF dictates how the multicast transmissions between the router and host are managed. Each of the hosts coupled to a router determines which of the potential multicast transmission groups, or channels, that it receives. When the communication link between the router and a plurality of hosts is shared by the plurality of hosts, bandwidth limitations on the communication link can require intelligent management of the multicast transmission provided via the communication link. For example, if a number of users reside on a single communication link and the bandwidth limitations only allow for a limited number of multicast transmissions to be supported over the communication link, usage of the particular multicast transmissions by the plurality of hosts must be monitored to ensure that bandwidth is not wasted on multicast transmissions which none of the hosts are actively receiving or using.

The present invention relates to the problem of efficiently addressing IGMP Group Leave messages that are lost in transmission from an end-user system to its supporting network node (e.g. an ATM DSLAM). For example, traffic overload controls that discard packets could cause such messages to be lost In conventional IGMP implementations, a lost Group Leave message would be detected by inspecting IGMP membership reports from end-user systems. These reports are sent in response to a general membership query (GMQ) message sent by the network node, typically every 125 seconds. In the case where other multicast operations (e.g. Group Coin requests) are dependent on the successful execution of the Leave request, it is not acceptable to wait 125 seconds for the loss of the Leave message to be detected before subsequent action can be taken to execute the Leave request. A problem with this solution, i.e. of waiting for and analyzing group membership reports, is that waiting 125 seconds to detect a lost message is too long when execution of the Leave message is gating another operation, such as a Group Join request.

U.S. application Ser. No. 09/469,034 filed Dec. 21, 1999 entitled "Method and Apparatus for an Improved Internet Group Management Protocol" (owned by the assignee hereof and incorporated herein by reference) (now U.S. Pat. No. 6,826,612) addresses, inter alia, the problem of lost Leave messages. The application proposes solving the problem by sending out another Leave message if a host that initiated the lost Leave message does not receive a GSQ (group specific query) message within a predetermined time interval from when the lost Leave message was sent. It is also undesirable to wait for a time interval to determine whether a Leave message was lost, especially when the Leave request is gating another operation such as a Group Join request. Also, since this solution resides at the end-user system, it would be difficult to ensure that it is widely implemented in the network.

U.S. Ser. No. 10/059,697 filed Jan. 29, 2002 entitled "Facilitating Improved Reliability of Internet Group management Protocol Through the Use of Acknowledge Messages" (owned by the assignee hereof and incorporated herein by reference) also addresses, inter alia, the problem of lost Leave messages. The patent application discloses methods of performing Group Leave and Group Join operations aided by the use of new negative and affirmative acknowledgement messages, By using these messages, the reliability of the IGMP protocol is improved since an end-user system that has issued Leave or Join requests is informed of the result of the requests and can respond appropriately In conventional IGMP implementations, when a Group Leave or Group Join request is not successful, such as would be the case in a lost Leave message, the end-user system that issued the request is not notified. In this case, the end-user systems and the network nodes (DSLAMs) must be provided with functionality to support the new acknowledgement messages. While upgrading network nodes to provide this functionality may be relatively easy to accomplish, it would be much more difficult to ensure that all end-user systems were upgraded to detect and correctly respond to the new acknowledgement messages.

In view of the problems and disadvantages discussed above, a means at a network node of quickly detecting and responding to the loss of Group Leave messages is needed.

It is an object of the invention to provide rapid or fast service restoration for lost IGMP Leave requests.

Another object of the invention is to provide, at the network node, a method and apparatus for quickly detecting and responding to the loss of Group Leave Requests.

Another object of the invention is to free up the no-longer required bandwidth and accept new Join messages more quickly than prior art solutions and with functionality that is implemented at the DSLAM only, which makes ensuring a network-wide implementation easier.

Another object of the invention is to improve the robustness and response it controls, such as in the case of IGMP supported services.

According to the invention, whenever a DSLAM (digital subscriber line access multiplexer) or a network node receives a Group Join message, it compares the MAC (media access control) address of the originating STB (set-top boxes) to that of previous Join messages with their existing connections. If a match is found, then the DSLAM will initiate a GSQ for the group of the matching previous Join request. If there is not enough resources to satisfy the requirements of the Group Join message (or subsequent Group Join messages), then it may either be ignored, or queued for later processing, once the normal GSQ sequence is complete and resources are available. If the multicast group is no longer needed, the connection to the group is then terminated, as per normal GSQ processing. This frees up bandwidth for any new Join messages. The normal GSQ processing which takes normally around two seconds, clears the trouble caused by the loss of Leave Message.

BRIEF DESCRIPTION OF THE DRAWINGS

The above and other objects, advantages and features of the invention will become more apparent when considered with the following specification and accompanying drawings wherein.

DETAILED DESCRIPTION OF THE INVENTION

Figure 1:
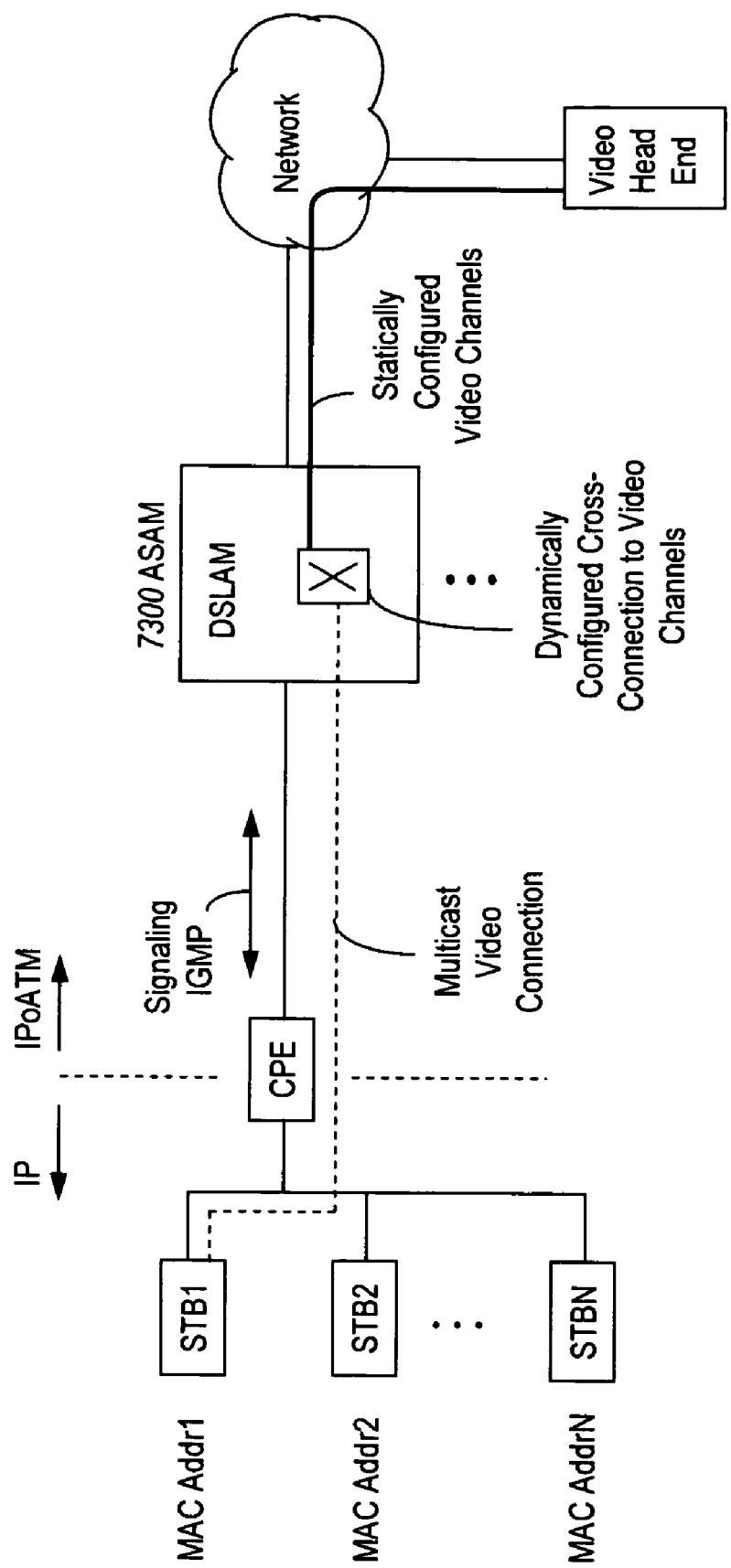
FIG. 1 shows a typical network architecture for multi-casting video or other high-speed services in an IP (internet protocol) over ATM (IPoATM) environment.

FIG. 1 shows a typical network architecture for multi-casting video, or other high-speed services, in an internet protocol (IP) over an asynchronous transfer mode (ATM) (IPoATM) environment. Referring to FIG. 1, a video head end provides statically configured channels to a DSL access multiplexer (DSLAM) via an ATM network. The video channels are dynamically cross-connected to customer premise equipment (CPE) units as IP multicast video connections over ATM. Each CPE unit performs IPoATM to IP interfacing to provide IP multicasted video channels to one or more set-top boxes. Each STB sends IGMP messages to the DSLAM to effect certain actions, such as joining or leaving a multicast group. If any of the messages required for such actions are lost, e.g. a Group Leave message, then the action will be delayed until the loss is detected and corrective measures are taken.

Figure 2:
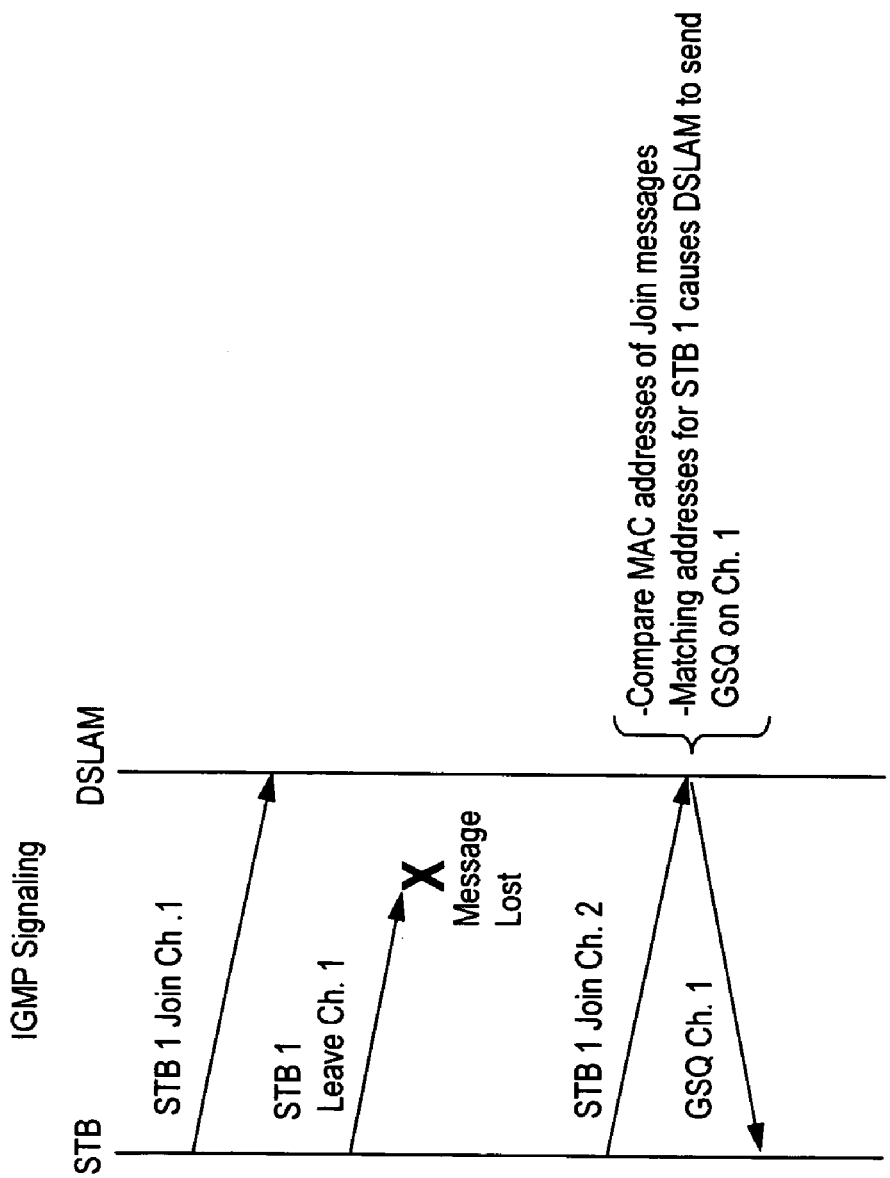
FIG. 2 represents an IGMP messaging center scenario incorporating the invention.

FIG. 2 represents the IGMP messaging scenario between a STB and a DSLAM. Referring to FIG. 2, the STB 1 sends the DSLAM a Group Join message requesting to join the multicast group for channel 1. Subsequent to a connection to channel 1 being established for STS 1 at the DSLAM, STB 1 sends a Group Leave message requesting a leave from the multicast group for channel 1. However, the channel 1 Leave message is lost before it is processed by the DSLAM. The STB 1 next sends a Group Join message to the DSLAM requesting to join the multicast group for channel 2 If the link between the CPE and DSLAM is currently bandwidth limited, the join request for channel 2 cannot be executed until more bandwidth becomes available, which would have been the case had the Leave request for channel 1 not been lost. Even if the link is not bandwidth limited, the loss of the Leave request for channel 1 will result in the bandwidth consumed by this connection being unavailable until the connection is cleared as the result of normal GMQ processing.

According to the invention, whenever a DSLAM receives a Group Join message, it compares the MAC address of the originating STB to that of previous Join messages for which there are existing connections. If a match is found, then the DSLAM will initiate a GSQ for the group of the matching previous Join request. If there is not enough resources to satisfy the requirements of the Group Join message (or subsequent Group Join messages), then it may either be ignored, or queued for later processing, once the normal GSQ sequence is complete and resources are available. If the multicast group is no longer needed, the connection to the group is then terminated, as per normal GSQ processing. This frees up bandwidth for any new Join messages. The normal GSQ processing, which takes normally around 2 seconds, clears the trouble caused by the lost Leave message.

Thus, the invention distinguishes from the prior art by the technique in which lost IGMP Group Leave messages are detected, and a corrective action is taken in response to that detection, specifically, the network node receives an IGMP Group Join message from an end-user, compares the MAC address obtained from a Join message of the end-user device to another MAC address obtained from a previous Join message for which there exists IP multicast connections to the network node. Then, the network node initiates a response to a match resulting from the comparison. A GSQ for the group of the matching previous Join request and if there is not a response as per normal GSQ processing, terminating the connection to the group.

ADVANTAGES OF THE INVENTION

The invention frees up the no-longer required bandwidth and accepts new Join messages more quickly than prior art solutions and with functionality that is implemented at the DSLAM only, which makes ensuring a network-wide implementation easier.

Response to controls is important to an end-user's satisfaction with any service. Therefore, improving the robustness and response of these controls, such as the present invention does in the case of IGMP supported services, is important to service providers and vendors of equipment that provides the services.

Acronyms Used Herein

Asynchronous Transfer Mode (ATM)
Customer Premise Equipment (CPE)
Digital Subscriber Line Access Multiplexer (DSLAMs)
General Membership Query (GMQ)
Group Specific Query (GSQ)
Internet Group Management Protocol (IGMP)
Internet Engineering Task Force (IETF)
Internet Protocol (IP)
Internet Protocol over ATM environment (IPoATM)
Media Access Control (MAC)
Set-top Boxes (STB)

While the invention has been described in relation to preferred embodiments of the invention, it will be appreciated that other embodiments, adaptations and modifications of the invention will be apparent to those skilled in the art.

What is claimed is:

1. A method of managing IP multicast connections in a network having a network node and a plurality of end users so as to provide management of lost leave internet group management protocol (IGMP) messages, said method comprising the steps of:

(a) at said network node, receiving an IGMP Group Join message from an end-user device serviced by said network node, said Join message indicates that the respective end-user device wishes to join a new multicast group;

(b) at said network node, comparing a MAC address, obtained from the Join message, of the end-user device to another MAC address obtained from a previous Join message for which there exists an IP multicast connection to said network node thereby determining if the MAC address of the user obtained from the Join message is already in an existing or active multicast group, and therefore a connection between the network node and the end-user device still exists since the Leave message has been lost to thereby identify the Leave message which was lost and never received by the network node;

(c) responsive to a match resulting from said comparing, initiating a GSQ for the group of the matching previous Join request;

(d) responsive to a result of the GSQ processing indicating that a connection to the group is no longer needed, terminating the connection to the group.

2. The invention defined in claim 1 wherein multiple Join-Leave pairs are dealt with in rapid succession.

3. A data communications network having one or more network nodes, said one or more network nodes including digital subscriber line access multiplexers, said network implementing the internet group management protocol (IGMP), said one or more network nodes having means for receiving an IGMP Group Join message from an end-user serviced by said network so as to provide management of lost Leave IGMP messages and comparing a media access control (MAC) address contained in said IGMP Group Join message of an end-user device to another MAC address obtained from a previous IGMP Group Join message, thereby determining if the MAC address of the user obtained from the Join message is already in an existing or active multicast group, and therefore a connection between the network node and the end-user device still exists since the Leave message has been lost to thereby identify the Leave message which was lost and never received by the network node; said network node initiating a group specific query (GSQ) with a group matching said previous IGMP Group Join requests and said network node terminating the connection to the group in response to the GSQ indicating that a connection to the group is no longer needed.

4. The system defined in claim 3 wherein said end-user device is a set-top box.

* * * * *